US011886148B2

(12) United States Patent
Boaron et al.

(10) Patent No.: US 11,886,148 B2
(45) Date of Patent: Jan. 30, 2024

(54) TIMEPIECE BEZEL

(71) Applicant: ROLEX SA, Geneva (CH)

(72) Inventors: Nicolas Boaron, Founex (CH); Julien Caillol, Geneva (CH); Benjamin Celant, Geneva (CH); Laurent Mincone, Jonzier-Epagny (FR); Michael Nguyen, Geneva (CH)

(73) Assignee: ROLEX SA, Geneva (CH)

( * ) Notice: Subject to any disclaimer, the term of this patent is extended or adjusted under 35 U.S.C. 154(b) by 368 days.

(21) Appl. No.: 16/822,248

(22) Filed: Mar. 18, 2020

(65) Prior Publication Data

US 2020/0301366 A1 Sep. 24, 2020

(30) Foreign Application Priority Data

Mar. 21, 2019 (EP) .................................... 19164397

(51) Int. Cl.
*G04B 19/28* (2006.01)
*G04B 19/22* (2006.01)

(52) U.S. Cl.
CPC ......... *G04B 19/283* (2013.01); *G04B 19/223* (2013.01)

(58) Field of Classification Search
CPC ...... G04B 19/28; G04B 19/22; G04B 19/223; G04B 19/283; G04G 21/08
See application file for complete search history.

(56) References Cited

U.S. PATENT DOCUMENTS 6,213,635 B1 4/2001 Savy et al.
6,453,512 B1 * 9/2002 Kaelin .................. G04B 3/041 368/308
8,864,369 B2 * 10/2014 Netuschill .............. G04B 37/08 368/294
8,911,143 B2 * 12/2014 Kitahara .............. G04B 37/103 368/308
9,188,959 B2 11/2015 Bertrand et al.
9,523,961 B2 * 12/2016 Kobayashi ............. G04B 3/043
10,018,963 B2 * 7/2018 Tschumi ................ G04B 19/18
11,048,213 B2 * 6/2021 Silvant ................. G04B 19/283
2002/0021624 A1 * 2/2002 Hiranuma ............ G04B 19/283 368/282
2004/0141424 A1 * 7/2004 Hartmann ............ G04B 19/283 368/295

(Continued)

FOREIGN PATENT DOCUMENTS

CH 700299 A2 7/2010
EP 0939351 A1 9/1999

(Continued)

OTHER PUBLICATIONS

Bulk modulus of polymers—google.com May 19, 2022.*

(Continued)

*Primary Examiner* — Sean Kayes
(74) *Attorney, Agent, or Firm* — Seckel IP, PLLC

(57) ABSTRACT

A timepiece component (1) for a watch case, notably a bezel, comprising an axis (A), a first ring (10), a second ring (11) and a connecting element (12) for connecting the first and second rings, the connecting element being elastic and positioned between the first and second rings, the first ring and/or the second ring comprising an element (31) for retention on the rest of a watch case (200), particularly on a watch middle (4).

23 Claims, 4 Drawing Sheets

(56) References Cited

U.S. PATENT DOCUMENTS

| | | | | |
|---|---|---|---|---|
| 2005/0007890 | A1* | 1/2005 | Bertrand | G04B 19/28 368/294 |
| 2005/0007891 | A1* | 1/2005 | Hiranuma | G04B 37/103 368/318 |
| 2013/0182544 | A1 | 7/2013 | Netuschill | |
| 2013/0201804 | A1 | 8/2013 | Bertrand et al. | |
| 2017/0123377 | A1 | 5/2017 | Tschumi et al. | |
| 2017/0212474 | A1* | 7/2017 | Iguchi | G04B 37/084 |
| 2017/0269553 | A1* | 9/2017 | Kadmiri | G04B 23/028 |
| 2018/0011445 | A1* | 1/2018 | Loetscher | G04B 19/283 |
| 2019/0271950 | A1* | 9/2019 | Kadmiri | G04B 37/0075 |
| 2019/0271954 | A1* | 9/2019 | Silvant | G04G 21/04 |
| 2019/0384224 | A1* | 12/2019 | Di Piazza | G04B 19/283 |

FOREIGN PATENT DOCUMENTS

| | | | |
|---|---|---|---|
| EP | 0980543 | A1 | 2/2002 |
| EP | 2615507 | A1 | 7/2013 |
| EP | 2624076 | A1 | 8/2013 |
| EP | 3141969 | A1 | 3/2017 |
| WO | 9944104 | A1 | 9/1999 |
| WO | 2015144423 | A1 | 10/2015 |

OTHER PUBLICATIONS

Sonelastic—https://www.sonelastic.com/en/fundamentals/tables-of-materials-properties/polymers.html May 19, 2022.*

European Search Report and Written Opinion dated Sep. 25, 2019 issued in counterpart application No. EP19164397 w/ English machine translation (total 14 pages).

* cited by examiner

TIMEPIECE BEZEL

This application claims priority of European patent application No. EP19164397.2 filed Mar. 21, 2019, the content of which is hereby incorporated by reference herein in its entirety.

The invention relates to a watch component, notably a timepiece bezel. The invention also relates to a watch case comprising such a watch component. The invention further relates to a timepiece comprising such a watch component or such a watch case. Finally, the invention relates to a method for producing such a watch component.

There are known embodiments of watch case devices equipped with a bezel, possibly notched, rotating in one or two directions. Bezels may consist of a number of parts, for example a bezel ring and a bezel disk, which may be made of the same material or of different materials. Such bezels are usually held axially by means of a retaining element, such as a gasket that can form a resilient return element, and may be returned axially by additional resilient return means.

For example, in the document EP2624076, a bezel is composed of two bezel parts which are fixed to one another by driving in. Resilient return means in the form of a gasket and helical springs allow relative axial play between the bezel and the watch middle, making it possible to modify the sensations perceived when the bezel is manipulated. These resilient return means positioned between the watch middle and the bezel are provided to supply a force reacting to the pressure exerted by the user, the parts forming the bezel being fixed to one another without any possibility of play.

The document EP2615507 describes a bezel composed of two bezel parts which are fixed to one another by driving in, using a radially deformable resilient element.

The document CH700299, for its part, discloses a bezel composed of two bezel parts which are fixed to one another by screwing.

In these various assemblies, the two bezel parts have no degree of freedom relative to one another.

There is also a known way of using adhesives, for example epoxide adhesives or double-sided adhesive tapes, to fix two bezel parts. However, the shear resistance of these adhesives is not always satisfactory or reproducible. Moreover, the behavior of the adhesives in response to environmental change (temperature, pressure, humidity, etc.) and ageing is not sufficiently satisfactory to meet the objectives regarding the performance of the product.

The document EP0980543 describes the assembly of a watch middle and a mounting ring in contact with one another. To form this assembly, an elastomeric element is overmolded between the watch middle and the mounting ring.

Some components of a timepiece, such as bezels, can be manipulated by a user. It is therefore important to optimize the user's perceptions during the manipulation of these components.

The sensation perceived by a user during the rotation of the bezel usually depends on the way in which it is manipulated, and notably on the axial pressure applied to it and the way in which this is distributed. In known designs, this sensation is provided by resilient return means positioned between the watch middle and the bezel, which supply a force reacting to the pressure exerted by the user. The various parts forming the bezel are fixed to one another without any possibility of play.

The object of the invention is to provide a watch component, notably a timepiece bezel, that is an improvement on the watch components known from the prior art. In particular, the invention proposes a watch component, notably a timepiece bezel, that enables the user's perceptions to be optimized during the manipulation of this component.

According to the invention, a watch component is defined by points 1 and 13 below.

1. A watch component for a watch case, notably a bezel, comprising an axis, a first ring, a second ring and a connecting element for connecting the first and second rings, the connecting element being elastic and positioned between the first and second rings, the first ring and/or the second ring comprising an element for retention on the rest of a watch case, particularly on a watch middle.

13. A watch component obtained by the implementation of the method for producing as defined in point 12 below.

Different embodiments of the component are defined by points 2 to 11 below.

2. The watch component as defined in point 1, wherein the watch component is designed to be mounted movably in rotation about the axis on the rest of a watch case or, notably, on a watch middle.
3. The watch component as defined in point 1 or 2, wherein:
   - the first ring and the connecting element are held or fixed to one another by adhesion by chemical bonding and/or by an obstacle, and/or
   - the second ring and the connecting element are fixed to one another by adhesion by chemical bonding and/or by an obstacle.
4. The watch component as defined in the preceding point, wherein the obstacle comprises at least a pin and/or at least a wedge and/or at least a bayonet and/or at least a groove and/or at least a cavity and/or at least a rod and/or at least a boss and/or an element with a helical geometry.
5. The watch component as defined in one of the preceding points, wherein the first ring and/or the second ring is textured at its interface with the connecting element.
6. The watch component as defined in one of the preceding points, wherein the first ring and/or the second ring is at least partially coated with a binder layer, notably an adhesion primer, at its interface with the connecting element.
7. The watch component as defined in one of the preceding points, wherein the first ring comprises a first lip extending toward the second ring, and/or in that the second ring comprises a second lip extending toward the first ring.
8. The watch component as defined in one of the preceding points, wherein the connecting element is made of elastomer or polymer, notably of shape memory polymer, or of natural or synthetic rubber or fluoroelastomer, of the FKM, FFKM or fluorosilicone type for example, or of EPDM rubber or nitrile or copolymer comprising a mixture of an elastomeric material and another material such as a thermoplastic, or of polyurethane (PU) or of poly(3-caprolactone) and styrene-butadiene-styrene copolymer (PCL/SBS).
9. The watch component as defined in one of the preceding points, wherein the bulk modulus of the connecting element is between 1 GPa and 4 GPa, or possibly between 1.5 GPa and 3 GPa or between 2 GPa and 2.5 GPa or between 1.5 GPa and 2.5 GPa.
10. The watch component as defined in one of the preceding points, wherein the first and second rings are rotationally fixed about the axis of the component and/or in that the connecting element comprises at least a cavity and/or at least an insert.

11. The watch component as defined in one of the preceding points, wherein the connecting element is formed directly between the first ring and the second ring, by overmolding for example, and/or in that the first ring is metallic or of ceramic material and/or in that the second ring is metallic or of ceramic material.

According to the invention, a method for making a watch component is defined by point 12 below.

12. A method for producing a watch component, notably a bezel and/or a watch component as defined in one of points 1 to 11, comprising a first ring, a second ring and a connecting element connecting the first and second rings, the method comprising the following steps:
    supplying the first ring and the second ring,
    positioning the first ring and the second ring with respect to one another, notably in a mold,
    inserting the connecting element, notably by injection or by overmolding, between the first and second rings,
    fixing the connecting element to the first ring and/or the second ring, notably by polymerization of the connecting element.

According to the invention, a watch case is defined by point 14 below.

14. A watch case comprising a component as defined in one of points 1 to 11 and 13.

A timepiece according to the invention is defined by point 15 below.

15. A timepiece, notably a wristwatch, comprising a watch case as defined in point 14 and/or a watch component as defined in one of points 1 to 11 and 13.

The attached figures show, by way of example, an embodiment of a timepiece according to the invention.

Figure 1:
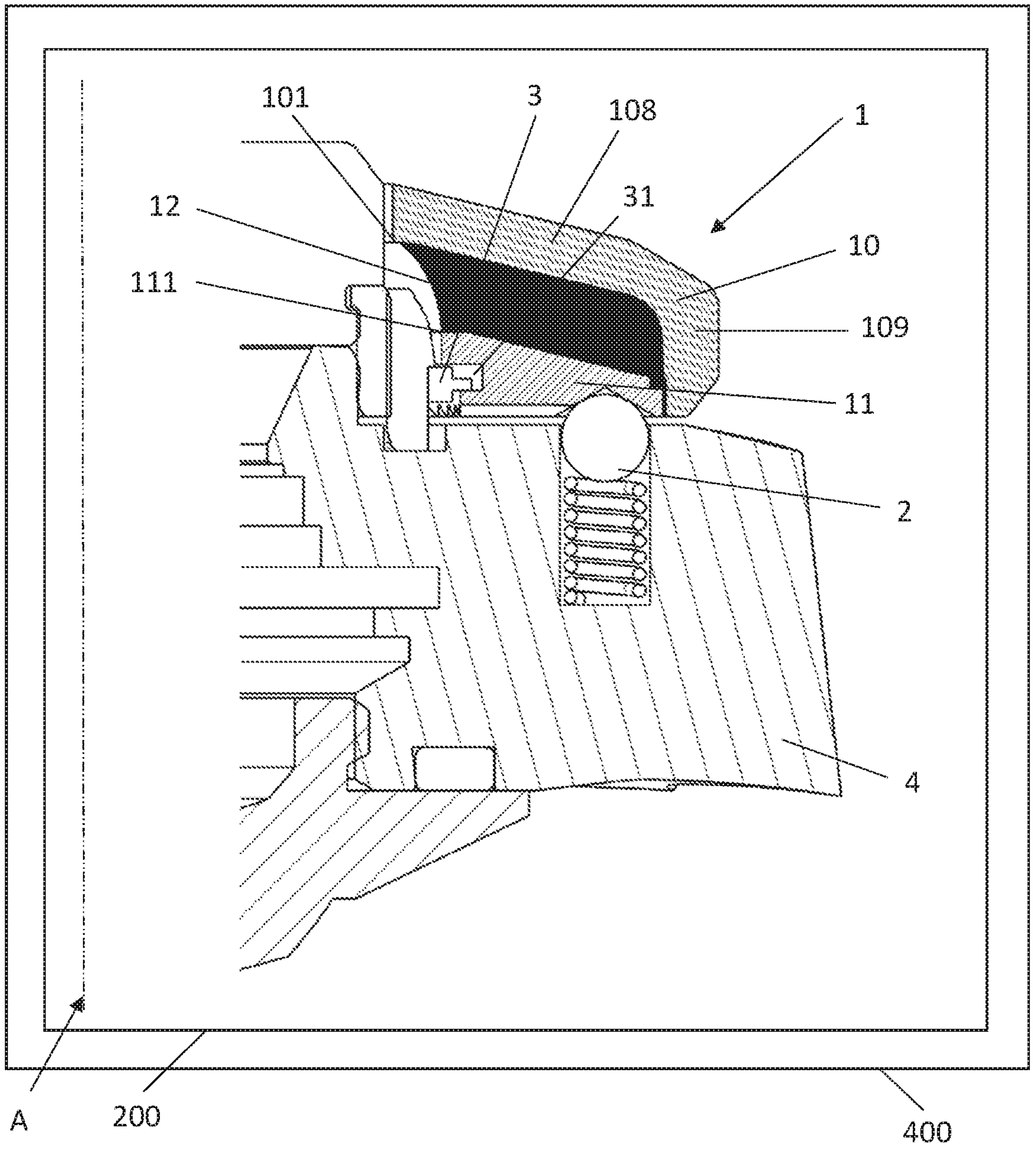
FIG. 1 is a view in partial section of an embodiment of a timepiece.
Figure 2:
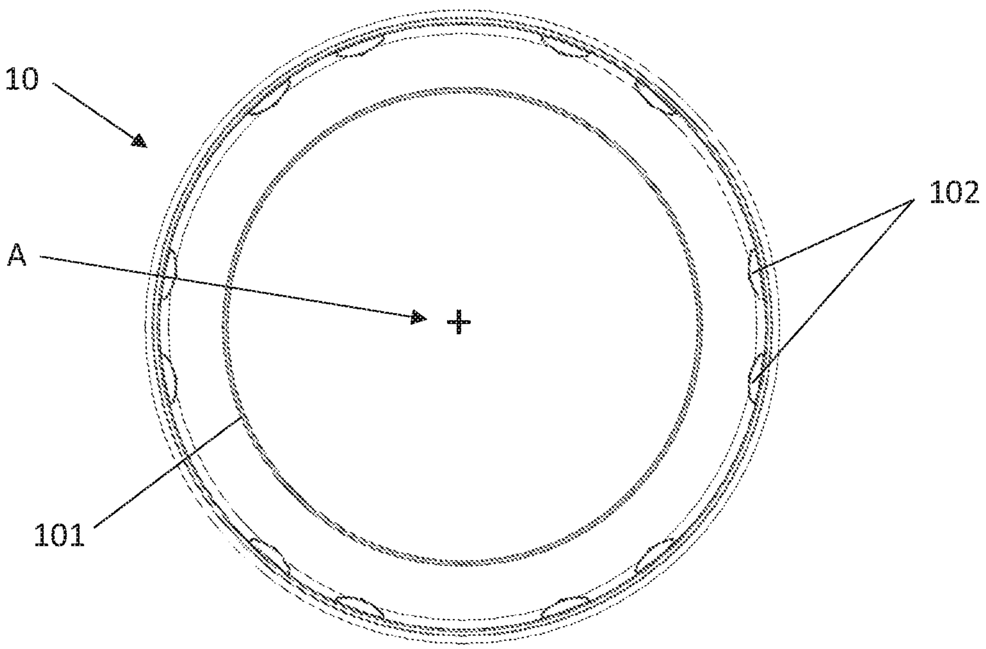
FIG. 2 is a view from below of a first ring of a bezel of the timepiece.
Figure 3:
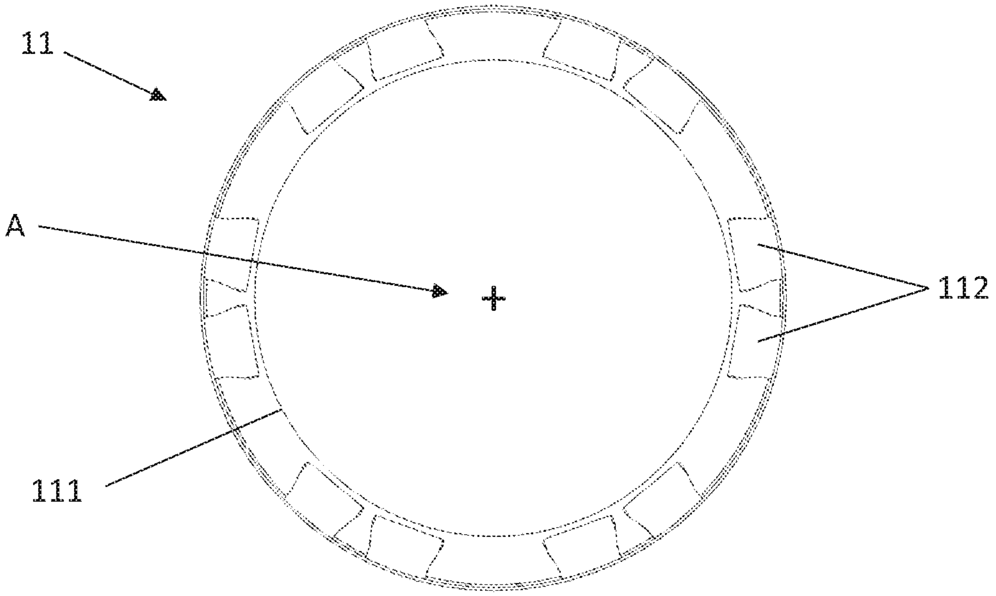
FIG. 3 is a view from above of a second ring of a bezel of the timepiece.
Figure 4:
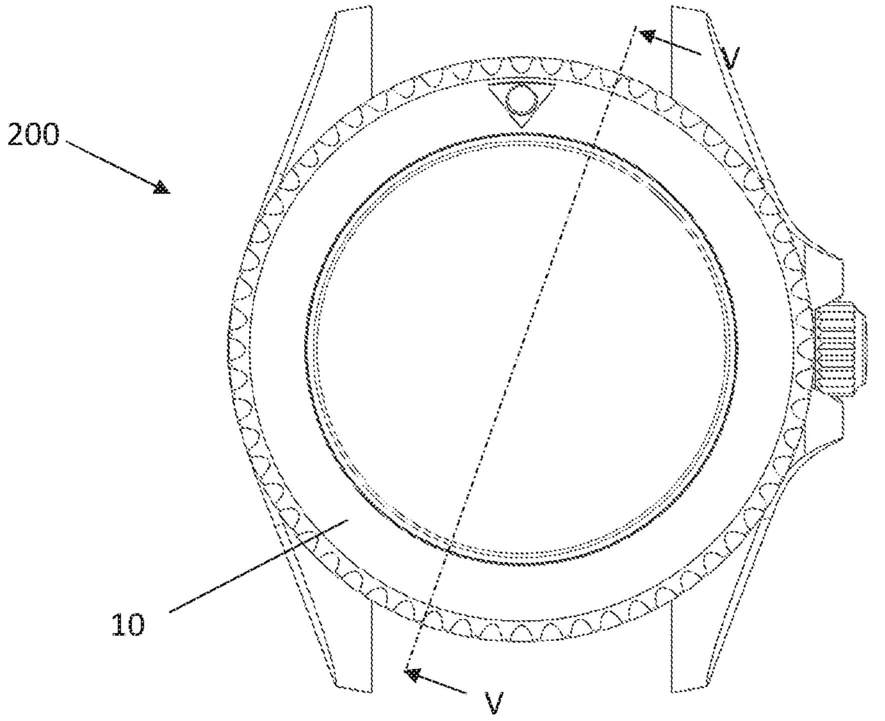
FIG. 4 is a view from above of the embodiment of the timepiece.
Figure 5:
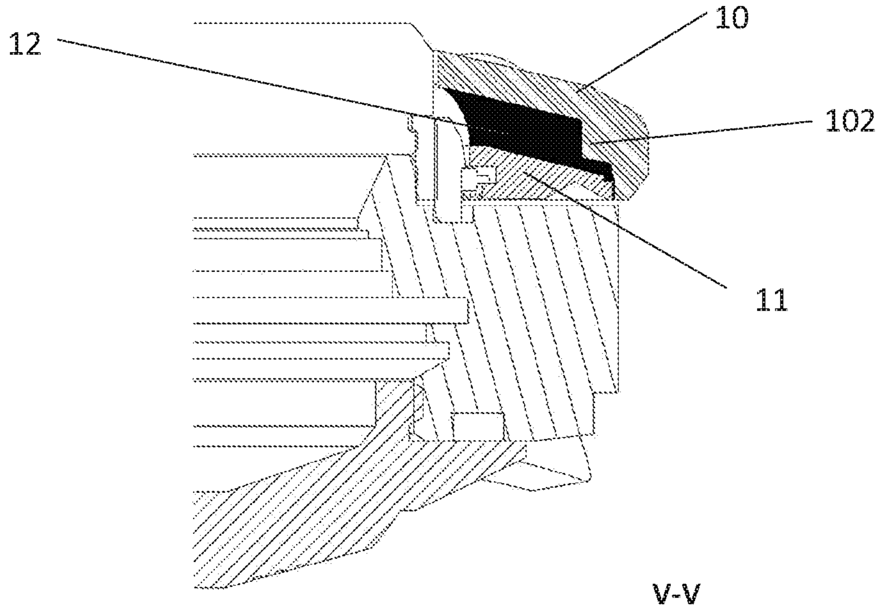
FIG. 5 is a partial section through the embodiment of the timepiece taken through the plane V-V of FIG. 4.

An embodiment of a timepiece 400 is described below with reference to FIGS. 1 to 6. The timepiece 400 is, for example, a watch or a wristwatch.

The timepiece 400 comprises an embodiment of a watch case 200.

The timepiece 400 and/or the watch case 200 comprises an embodiment of a watch component 1. The watch component 1 is, for example, a component that can be manipulated by a user of the timepiece, notably a bezel or a crown. For example, the component is mounted movably in rotation about an axis A on the rest of the watch case 200 or on a watch middle. The component may take the form of any movable watch component, such as a rotating ring positioned around the base of a case, for example. Notably, the component is manipulated by the user, that is to say moved relative to the rest of the watch case 200, in order to carry out, for example, an adjustment or a winding of the timepiece.

The watch component 1 comprises, in addition to the axis A, a first ring 10, a second ring 11 and a connecting element 12 connecting the first and second rings.

The connecting element 12 is a resilient interposed means and is positioned between the first and second rings.

The connecting element 12 is interposed between the first and second rings, that is to say positioned at the interface of the first and second rings, for the purpose of optimizing the sensations perceived by the user during the manipulation of the component, and for the purpose of assembling the two rings.

The watch component is mounted on the rest of the watch case 200, for example on a watch middle, notably being snap fitted by means of a gasket 3 enabling said component to be held axially. For this purpose, the first ring and/or the second ring comprises an element 31 for retention on the rest of the watch case 200, particularly on the watch middle 4, or an element 31 for holding on the rest of the timepiece case, particularly on the watch middle 4, or an element 31 for fixing to the rest of the timepiece case, particularly the watch middle 4. In the embodiment shown, the element 31 is a groove formed in the second ring 11. This element 31 interacts here as an obstacle with the gasket 3 for retaining or holding or fixing the watch component 1 on the rest of the timepiece case, particularly on the watch middle 4. The retention here allows the watch component to be rotated relative to the rest of the watch case about the axis A.

The element 31 may have any other geometry and/or any other retention function.

FIG. 1 shows a rotating bezel 1 comprising the first ring 10, the second ring 11 and the connecting element 12. The watch component is also returned axially by resilient return means 2. The resilient return means 2 may, for example, take the form of ball clicks. "Ball click" is taken to mean, for example, a ball returned resiliently by a spring, notably a helical spring, toward the bottom of an indentation with which the ball interacts.

The first ring acts, for example, as a decorative element. It may comprise, for example, at least two portions whose purpose is:
- to carry the display, for example hour or minute indexing, and/or
- to allow gripping.

The first ring may have an L-shaped cross section. Overall, it may have a first frustoconical portion 108 (with an axis A) and a second cylindrical portion 109 (with an axis A). The first portion may have a half angle at its top of between 70° and 85°, for example.

The first ring 10 may comprise at least one first obstacle 102 arranged so that it can come into contact with the connecting element 12. The at least one first obstacle 102 may be a pin and/or a wedge and/or a bayonet element and/or a groove and/or a cavity (of dovetail shape, for example) and/or a rod and/or a boss and/or an element having a helical geometry (a thread, for example). First obstacles 102 of different shapes may be associated.

The first ring 10 may be manufactured by known manufacturing methods. It is, for example, made of ceramic, glass, composite material, metal alloy or any other suitable material. The first ring 10 may form the visible portion of the component or the larger part of the visible portion of the component.

The second ring 11 has, for example, a functional role in the watch component and/or a functional role in the connection of the component to the watch middle 4 of the watch case 200. The second ring 11 may be made of any material suitable for providing its function. Notably, the second ring 11 may be formed from a metal or from a metal alloy, such as a steel for example. However, other materials may be envisaged, particularly ceramic or composite materials.

The second ring 11 may have a substantially flat geometry.

The second ring 11 may comprise at least one second obstacle 112 arranged so that it can come into contact with the connecting element 12. The at least one second obstacle 112 may be a pin and/or a wedge and/or a bayonet element and/or a groove and/or a cavity (of dovetail shape, for example) and/or a rod and/or a boss and/or an element having a helical geometry (a thread, for example). Second obstacles 112 of different shapes may be associated.

The first ring 10 is preferably arranged so that it masks the second ring 11 when the component is viewed in a direction parallel to the axis A, and so that it masks the second ring when the component is viewed perpendicularly to the axis A, as a result of which only the material forming the first ring 10 is visible to the wearer.

The first and second rings may be of the same kind or of different kinds.

Preferably, the first ring 10 and the connecting element 12 are held or fixed to one another by adhesion, by chemical bonding, and/or by an obstacle 102.

Preferably, the second ring 11 and the connecting element 12 are held or fixed to one another by adhesion, by chemical bonding, and/or by an obstacle 112.

Thus, preferably, the connecting element 12 enables the two rings 10, 11 of the component 1 to be fixed together.

Additionally or alternatively, the first and second rings are rotationally fixed about the axis A of the component. "Rotationally fixed" is taken to mean that no angular play is perceptible to a user when the component is manipulated.

The connecting element 12 may comprise first mechanical attachment means capable of interacting with at least one first obstacle 102 of the first ring 10, the first obstacles 102 providing a mechanical attachment function.

Additionally or alternatively, the connecting element 12 may comprise second mechanical attachment means capable of interacting with at least one second obstacle 112 of the second ring 11. The at least one second obstacle 112 provides a mechanical attachment function.

Thus, a surface of the second ring 11 is designed to be fixed to a surface of the first ring 10 through the interposition of the connecting element 12. The aforementioned obstacles 102, 112 enable the fixing of the first and second rings to be reinforced. Advantageously, at least one second obstacle 112 of the second ring 11 interacts directly with attachment means of the connecting element 12, and/or the at least one first obstacle 102 of the first ring 10 interacts directly with attachment means of the connecting element 12.

The first ring may be textured at its interface with the connecting element.

The second ring may be textured at its interface with the connecting element.

This texturing or these texturings make it possible to increase the surface area of the surface and/or to optimize the wettability of the surface on which the connection with the connecting element 12 may take place. "Texturing" is taken to mean, notably, any surface treatment for modifying the state of a surface of one and/or the other of the first and second rings 10, 11.

As a general rule, by adjusting the stiffness of the connecting element 12 it is possible to adapt the response of the component to the forces applied during manipulation and/or to shocks.

Thus, the connecting element 12 is advantageously made partially or wholly of elastomer or polymer, notably of shape memory polymer, or of natural or synthetic rubber or fluoroelastomer, of the FKM, FFKM or fluorosilicone type for example, or of EPDM rubber or nitrile or copolymer comprising a mixture of an elastomeric material and another material such as a thermoplastic (such an example of a mixture is also known by the term "thermoplastic elastomer"), or of polyurethane (PU) or poly(3-caprolactone) and styrene-butadiene-styrene copolymer (PCL/SBS).

In a particular variant, polymers may be combined.

Advantageously, the formulation of the polymer is selected to impart a greater or lesser degree of stiffness to the whole component, in order to optimize the sensations perceived by the user. The formulation of the polymer may also be important for providing an shock absorption function (for preserving the integrity of the product), with a judicious choice of the elastic moduli, viscous moduli and loss factor, thus making it possible to dissipate more of the energy due to the dynamic stresses that are to be "filtered". This preserves the component itself and contributes to a modification of the transfer function of the shock transmission chain between the watch component and the movement, thus limiting the acceleration affecting the latter.

In a variant, the connecting element may be formed by injection, casting, compression or transfer. This forming usually results in a shrinkage or expansion of the connecting element, which depends on the nature of the polymer used, and which may be anticipated by adapting the parameters of the method.

The forming of the polymer preferably takes place directly between the first ring 10 and the second ring 11, by overmolding for example. In this variant, the at least one mechanical attachment means capable of interacting with the at least one first obstacle 102 or the at least one second obstacle 112 is produced during the overmolding of the polymer. The polymer traps said obstacles.

The bulk modulus of the connecting element is preferably between 1 GPa and 4 GPa, or possibly between 1.5 GPa and 3 GPa or between 2 GPa and 2.5 GPa or between 1.5 GPa and 2.5 GPa.

The connecting element 12 may comprise at least one cavity and/or at least one insert. This enables the connecting element 12 to be structured in order to soften or stiffen it. This option makes it possible to optimize the transmission of the torque during manipulation, and/or to define the impact absorption dynamic range.

Figure 6:
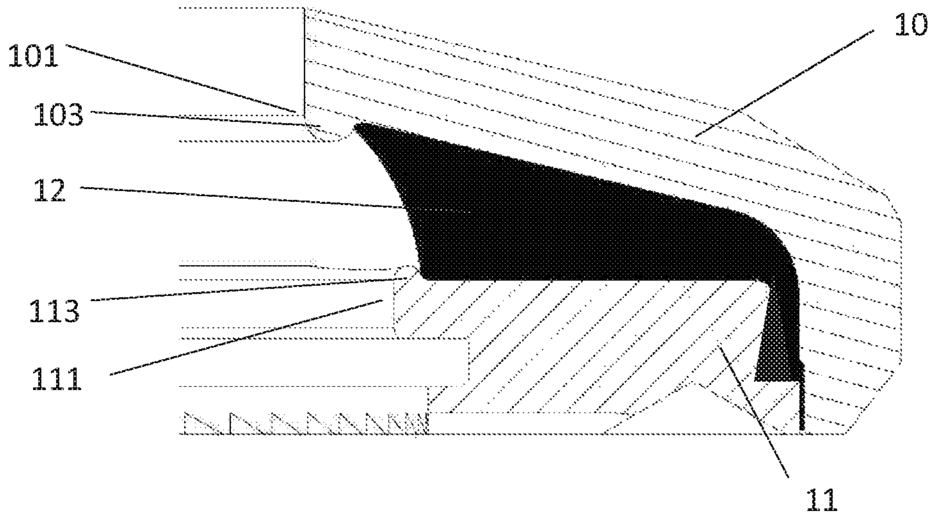
FIG. 6 is a partial section through a variant embodiment of the timepiece according to the invention.

As shown in FIG. 6, the first ring may comprise a first lip 103 extending toward the second ring, for example in the direction of the axis A or substantially in this direction. This first lip 103 is, for example, formed on the internal diameter or on the internal periphery of the first ring.

As shown in FIG. 6, the second ring may comprise a second lip 113 extending toward the first ring, for example in the direction of the axis A or substantially in this direction. This second lip 113 is, for example, formed on the internal diameter or on the internal periphery of the second ring.

The second lip 113 may be a raised lip without sharp corners on an inner edge 111. Advantageously, the second lip 113 may be used to modify the stiffness of the connecting element 12. As the second lip 113 becomes more pronounced, the stiffness of the connecting element 12 increases because of the limiting of the lateral expansion of the connecting element 12 when subjected to a pressure along the axis A. The second lip 113 may also act as a stop (in contact with the first ring, notably with the first lip 103) and reduce the permitted play (movement along the axis A of the first ring relative to the second ring).

On the same principle, depending on their geometry and location, the obstacles 102, 112 may be used to modify the stiffness of the connecting element 12.

In the variant of FIG. 6, the first raised lip 103 with no sharp corner at an inner edge 101 and/or the second raised lip 113 with no sharp corner at an inner edge 111 can prevent the detachment of the connecting element 12 from the first ring 10 and avoid the external exposure of the connecting element 12. Advantageously, the first lip 103 may be used to modify the stiffness of the connecting element 12. As the first lip 103 becomes more pronounced, the stiffness of the connecting element 12 increases because of the limiting of the lateral expansion of the connecting element 12 when subjected to a pressure along the axis A. The first lip 103 may also act as a stop (in contact with the second ring, notably with the second lip 113) and reduce the permitted play (movement along the axis A of the first ring relative to the second ring).

The invention also relates to a method for assembling the watch component 1 comprising the first ring 10 and the second ring 11, these rings being designed to be fixed to one another with a relative play before the combination is assembled onto the rest of a timepiece case, notably onto a watch middle.

Advantageously, the method enables the positioning between the first ring and the second ring to be optimized.

In an embodiment described below, the assembly method comprises:

- a step of supplying first and second rings,
- a step E1 of positioning the first ring 10 and the second ring 11 relative to one another, notably in a mold,
- a step E2 of introducing or inserting or forming the connecting element 12 between the first and second rings,
- a step E3 of fixing the connecting element 12 to the first ring 10 and/or the second ring 11, notably by polymerization of the connecting element.

The method may comprise optional additional steps, such as a preliminary step E0 of preparing the surfaces of the rings or a step E4 of trimming.

By fixing the connecting element 12 to the first ring 10 and/or the second ring 11 it is possible to prevent a separation of these elements. Depending on the geometry of the rings, the connecting element 12 may be subjected to a number of forces that may detach the rings, such as direct traction, shearing or tearing (starting, for example, at one edge and being propagated along the interface separating the materials of the different elements).

As mentioned above, the fixing means for fixing:

the first ring 10 and the connecting element 12; and/or the second ring 11 and the connecting element 12, may be chemical bonds, mechanical attachment means, mechanical assembly means, or a combination of these.

In a first example of execution, the second step E2 of introducing the connecting element 12 or of forming the connecting element 12 comprises an overmolding step. Such overmolding offers numerous advantages over the other examples of embodiment described below. It makes it possible to reduce the shape constraints in the forming of the connecting element 12 and the machining tolerances of the first ring 10 and/or the second ring 11, which are brought into contact with the connecting element 12, while allowing precise positioning of the first ring 10 relative to the second ring 11.

In this first example of execution, the fixing between the two rings and the connecting element 12 takes place solely by chemical bonding.

The "force" or mechanical strength of the chemical bond is affected by a number of factors. The first relates to the capacity of the backing to be wetted by the chemical bonding agent, for example a polymer, an adhesive material or a primer. Better wettability provides a better contact between the two materials and a greater opportunity for bonding. For example, it may be the result of a combination of the temperatures of the materials and/or the viscosity of a polymer or of a primer, and/or the texture and/or the porosity of a surface brought into contact with the polymer or the primer.

In a particular variant, the component comprises at least one binder layer, for example a primer. This coat is deposited on a surface of the first ring and/or of the second ring to which the connecting element 12 is to adhere.

Thus, in a variant of the first example of execution, the adhesion between the polymer and the second ring 11 and/or the first ring 10 is improved by the presence of a primer. A first primer is advantageously deposited on the surfaces of the second ring 11 to which the connecting element 12 is to adhere, in order to optimize the adhesion between the second ring 11 and the connecting element 12. This first primer covers at least a part of the contact surface between the connecting element 12 and the second ring 11. Advantageously, it covers all of said surface, providing adhesion over the whole of this surface. A second primer is advantageously deposited on the surfaces of the first ring 10 to which the connecting element 12 is to adhere, in order to optimize the adhesion between the first ring 10 and the connecting element 12. This second primer covers at least a part of the contact surface between the connecting element 12 and the first ring 10. Advantageously, it covers all of said surface, providing adhesion over the whole of this surface.

These primers will be advantageously chosen on the basis of the constituent materials of the second ring and/or of the first ring and/or of the connecting element. They may, notably, be chosen from among the following products, known by their trade names: Cilbond®, Megum®, Thixon®, Chemlok® and Chemosil®.

In a variant, the same primer is used on the first ring 10 and the second ring 11.

In a variant, a repellent surface treatment may be applied to the surfaces to which the connecting element 12 is not to adhere.

In another variant of the first example of execution, the surface of the first ring 10 and/or of the second ring 11 is textured to create mechanical micro-anchors and/or to increase the surface area of the surface and/or to optimize the wettability of the surface on which the chemical bond may be formed with the connecting element. This texturing may be carried out by mechanical means (sandblasting or machining) or by other means (laser structuring) or by any other means known to those skilled in the art.

In another variant of the first example of execution, the first ring 10 and/or the second ring 11 may comprise, as mentioned above, at least one first or one second obstacle 102, 112. In this case the polymer is injected and then polymerized in and/or around the at least one first or second obstacle 102, 112 formed by the shaping of the first and/or second ring 10, 11.

In the first step E1 of positioning the first ring 10 and the second ring 11 relative to one another, the first and second rings 10, 11 are advantageously positioned in an injection mold, in positions corresponding to their relative positions when no mechanical force is exerted on the component 1. The rings are held in position, notably by means of pins, machined geometries or any other element allowing the orientation of the rings 10 and 11 in the mold. A space remaining between the two rings in the mold forms a volume which will be filled by the connecting element 12, allowing for shrinkage. The space between the parts may be defined by support faces in the mold. The dimensions of the connecting element 12 are then defined by the remaining space in the mold.

In the second step E2 of introducing the connecting element 12 or of forming the connecting element 12, a polymer is preferably injected so as to fill the space between the two rings.

In a second example of execution, the first and the second step are carried out simultaneously and the step of fixing the connecting element to the rings is mechanical and/or chemical, but takes place between finished parts (by contrast with the first example of execution, in which the connecting element takes shape during the fixing step E3).

In this second example, the component is formed from three solid parts (the first ring, the second ring and the connecting element) which are assembled together. The connecting element is preferably a polymer that has been previously formed by injection, casting or compression or any other known method for producing at least one connecting element with a predetermined or predefined geometry. The two rings and the connecting element are fixed together (step E3) by the mechanical attachment means that are present on the connecting element and that are capable of interacting with the at least one first obstacle 102 of the first ring and/or the at least one second obstacle 112 of the second ring. This fixing may be permitted by the elastic deformation of the connecting element and/or the geometry of the attachment means. Notably, this fixing may be carried out by clipping the first ring onto the connecting element and/or by clipping the second ring onto the connecting element, so that these three elements are fixed together mechanically.

In a variant of the second example of execution, a chemical bonding agent, notably an adhesive, may be added between the connecting element and the first ring over some or all of the surfaces designed to come into contact with one another. Similarly, a chemical bonding agent, notably an adhesive, may be added between the connecting element and the second ring over some or all of the surfaces designed to come into contact with one another. In this case, step E3 consists in assembling the three parts (first ring, connecting element and second ring) by means of the chemical bonding agent.

In another variant of the second example of execution, the mechanical attachment means and the chemical bonding agent may be used together to assemble, on the one hand, the first ring to the connecting element and/or, on the other hand, the second ring to the connecting element.

Regardless of the variant, the example or the mode of execution of the method, it may be the case that the connecting element overflows, notably if it has been introduced by overmolding or if it has been compressed in the second example of execution. In this case, the method may comprise a step of trimming the component, executed in order to remove excess material. This step may be executed by using any known technique.

In the variant execution of the method in which a primer is used, this step of eliminating or removing material is facilitated by the absence of primer on the surfaces of the first ring and the second ring not included in the fixing. Whereas the polymer adheres strongly to the surfaces coated with primer, any flash only comes into contact with surfaces free of primer, and this flash may thus be removed easily without any risk of damaging the surfaces that are not intended to be fixed.

In a variant execution of the method, the surfaces where burr may be present and to which the connecting element 12 is not to adhere may be protected by a repellent surface treatment preventing the adhesion of the polymer. The surface treatment may be temporary or final.

The method described above may be used to produce a watch component, and particularly to produce a bezel. The resulting component has the appearance of a one-piece part. Preferably, the different elements can only be detached from one another by sacrificing the connecting element.

By comparison with prior art rotating bezels consisting of two rings assembled rigidly (by screwing, riveting or insertion), the rivets and screws are usually visible and detract from the appearance of the component.

Moreover, screws tend to become unscrewed. Furthermore, the stiffness of the assembly does not modify the perception of a user.

By comparison with the prior art rotating bezels consisting of two rings assembled by adhesion using a rigid adhesive, the resistance to environmental conditions of the bezels produced according to the invention is improved, because adhesives are usually less durable than a polymer. Furthermore, the possibility of rupture or detachment of rigid adhesives under the effect of impacts cannot be ruled out, whereas the elasticity of a polymer enables some of these impacts to be absorbed, thereby making the assembly less sensitive to progressive deterioration. Additionally, the stiffness of the assembly does not modify the perception of a user.

Thus the sensations imparted to the user are improved, while the quality and robustness of the fixing and interaction between the rings of the component are ensured, by comparison with use of screws or adhesive. Furthermore, the invention provides a high degree of versatility in terms of the appearance of the watch component.

The component described above has the advantages listed below.

As a result of the solutions proposed in this document, the first and second ring are assembled without being in continuous contact with one another. Furthermore, they may be moved relative to one another even after they have been assembled by the connecting element. The amplitude and direction of the relative movement between the first and second rings is defined by the stiffness of the connecting element and any stops and/or obstacles.

By contrast with the known design methods in which the different parts forming the bezel are fixed to one another without any possibility of play, and in which the sensation imparted to the user is provided, notably, by means of resilient return means positioned between the watch middle and the bezel, which provide a force in reaction to the pressure exerted by the user, as a result of the solutions according to the invention, the different rings forming the bezel are slightly movable relative to one another. This is because the relative play defined between the two rings by criteria of stiffness and damping of the connecting element 12 makes it possible to optimize the sensations during the manipulation of the movable component.

Conversely, according to the known prior art embodiments where two rings of a bezel are rigidly connected to one another, the sensations during manipulation are similar to those perceived with a one-piece bezel.

It should also be noted that the prior art modes of assembly offer no real specific protection against impact, owing to the absence of play or the limited play between the rings. Conversely, owing to the component described above, any impacts applied to the component are absorbed and the vibrations are damped in a frequency range defined by the stiffness of the connecting element. In other words, a connecting element as described above enables the component to be protected by acting as a vibration damper and/or impact absorber. The connecting element also provides mechanical protection of the first ring by providing, among other things, an impact absorption and/or a vibration damping function. By comparison with the prior art solutions in which the bezel is made of a number of assembled parts, the connecting element generates very few stresses in the rings. It will be recognized that the mode of assembly according to the invention is particularly advantageous for the assembly of a ceramic ring onto a metallic ring.

Preferably, the connecting element described above advantageously enables the two rings of the component to be fixed together without affecting the appearance of the component, while ensuring that there is no interstice which could give rise to problems of corrosion or dirt trapping.

The invention claimed is:

1. A watch component for a watch case, the watch component being a rotatable bezel comprising:

an axis, a first ring, a second ring, and a connecting element for connecting the first and second rings, the connecting element being elastic and positioned between the first and second rings, the first ring comprising a substantially cylindrical portion oriented along the axis, a peripheral cylindrical surface of the substantially cylindrical portion forming a visible portion of the watch component, wherein the first ring is arranged so that the first ring masks the second ring when the watch component is viewed in a direction parallel to the axis and so that the first ring masks the second ring when the watch component is viewed in a direction perpendicular to the axis, the first ring being adapted for manipulation by a user, and the second ring being adapted for retention on a base of the watch case.

2. The watch component as claimed in claim 1, wherein the watch component is designed to be mounted movably in rotation about the axis on the rest of the watch case.

3. The watch component as claimed in claim 1, wherein at least one selected from the group consisting of the first ring and the connecting element are held or fixed to one another by at least one selected from the group consisting of (i) adhesion by chemical bonding and (ii) an obstacle, the second ring and the connecting element are fixed to one another by at least one selected from the group consisting of (i) adhesion by chemical bonding and (ii) an obstacle.

4. The watch component as claimed in claim 3, wherein holding or fixation is by an obstacle, and the obstacle comprises at least one selected from the group consisting of a pin, a wedge, a bayonet, a groove, a cavity, a rod, a boss, and an element with a helical geometry.

5. The watch component as claimed in claim 1, wherein at least one selected from the group consisting of the first ring and the second ring is textured at its interface with the connecting element.

6. The watch component as claimed in claim 1, wherein at least one selected from the group consisting of the first ring and the second ring is at least partially coated with a binder layer at its interface with the connecting element.

7. The watch component as claimed in claim 6, wherein the binder layer is an adhesion primer layer.

8. The watch component as claimed in claim 1, wherein at least one selected from the group consisting of:

the first ring comprises a first lip extending toward the second ring, the second ring comprises a second lip extending toward the first ring.

9. The watch component as claimed in claim 1, wherein the connecting element is made of elastomer or polymer, or of natural or synthetic rubber or fluoroelastomer, or of ethylene propylene diene terpolymer (EPDM) rubber or nitrile or copolymer comprising a mixture of an elastomeric material and another material, or of polyurethane (PU), or of poly(3-caprolactone) and styrene-butadiene-styrene copolymer (PCL/SBS).

10. The watch component as claimed in claim 1, wherein the bulk modulus of the connecting element is between 1 GPa and 4 GPa.

11. The watch component as claimed in claim 1, wherein at least one selected from the group consisting of:

the first and second rings are rotationally fixed about the axis of the component, the connecting element comprises at least a cavity and/or at least an insert.

12. The watch component as claimed in claim 1, wherein at least one selected from the group consisting of:

the connecting element is formed directly between the first ring and the second ring, the first ring is metallic or of ceramic material, the second ring is metallic or of ceramic material.

13. A method for producing a watch component, comprising a first ring, a second ring, and a connecting element connecting the first and second rings, the method comprising:

providing the first ring and the second ring, positioning the first ring and the second ring with respect to one another, inserting the connecting element between the first and second rings, and fixing the connecting element to at least one selected from the group consisting of the first ring and the second ring, so as to obtain the watch component as claimed in claim 1.

14. The method as claimed in claim 13, wherein:

the positioning of the first ring and the second ring with respect to one another is in a mold, the inserting of the connecting element between the first and second rings is by injection or by overmolding, and the fixing of the connecting element to at least one selected from the group consisting of the first ring and the second ring is by polymerization of the connecting element.

15. A watch component as claimed in claim 1, wherein the second ring comprises an element for retention on the rest of the watch case.

16. A watch case comprising the watch component as claimed in claim 1, wherein the watch component is rotatably mounted on a base of the watch case.

17. A timepiece comprising a watch case as claimed in claim 16.

18. The watch component as claimed in claim 1, which is a watch bezel.

19. The watch component as claimed in claim 1, wherein the element for retention on the rest of the watch case is configured for retention on the watch middle.

20. The watch component as claimed in claim 19, wherein the watch component is designed to be mounted movably in rotation about the axis on the watch middle.

21. The watch component as claimed in claim 1, wherein the first ring, seen in a direction parallel to the axis and seen in a direction perpendicular to the axis, covers entirely the second ring.

22. The watch component as claimed in claim 1, wherein the substantially cylindrical portion forms a largest radius periphery of the first ring.

23. The watch component as claimed in claim 1, wherein the watch component is designed to be rotatably mounted on a base of a watch case, wherein the rotatable bezel is rotatable about a main axis of the watch case.

* * * * *